United States Patent
Mowatt et al.

(10) Patent No.: US 10,715,603 B2
(45) Date of Patent: Jul. 14, 2020

(54) SYSTEMS AND METHODS FOR SHARING APPLICATION DATA BETWEEN ISOLATED APPLICATIONS EXECUTING ON ONE OR MORE APPLICATION PLATFORMS

(71) Applicant: Microsoft Technology Licensing, LLC, Redmond, WA (US)

(72) Inventors: David Mowatt, County Dublin (IE); Stephen O'Driscoll, Bray (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 15/268,950

(22) Filed: Sep. 19, 2016

(65) Prior Publication Data
US 2018/0084056 A1    Mar. 22, 2018

(51) Int. Cl.
*G06F 15/177*    (2006.01)
*H04L 29/08*    (2006.01)
(Continued)

(52) U.S. Cl.
CPC .............. *H04L 67/125* (2013.01); *G06F 9/46* (2013.01); *H04L 61/1547* (2013.01);
(Continued)

(58) Field of Classification Search
USPC ........................ 709/219, 224, 226; 715/751
See application file for complete search history.

(56) References Cited

U.S. PATENT DOCUMENTS

| 7,546,582 | B2 | 6/2009 | Smith |
| 8,954,732 | B1 | 2/2015 | Watsen et al. |

(Continued)

FOREIGN PATENT DOCUMENTS

| CN | 103218220 A | 7/2013 |
| CN | 104865837 A | 8/2015 |

(Continued)

OTHER PUBLICATIONS

"International Search Report and Written Opinion Issued in PCT Application No. PCT/US2017/051237", dated Nov. 20, 2017, 10 Pages.

(Continued)

*Primary Examiner* — Thanh T Nguyen

(57) ABSTRACT

Systems, methods, and software are disclosed herein for facilitating dynamic sharing of application data among multiple isolated applications executing on one or more application platforms. In an implementation, a method of operating an application platform executing an application to consume application data generated by other applications executing on one or more application platforms is disclosed. The method includes receiving an instruction to invoke the application in a runtime environment. The instruction is generated by a data sharing and decision service platform based on one or more application data feeds provided by the other applications registered with the data sharing platform. The method further includes processing the instruction to automatically invoke the application in the runtime environment and, once the application is invoked, directing the party application to perform the action.

20 Claims, 10 Drawing Sheets

(51) Int. Cl.
*G06F 9/46* (2006.01)
*H04L 29/12* (2006.01)
(52) U.S. Cl.
CPC ............ *H04L 67/025* (2013.01); *H04L 67/06* (2013.01); *H04L 67/20* (2013.01)

(56) References Cited

U.S. PATENT DOCUMENTS

| | | | |
|---|---|---|---|
| 8,984,113 B2 | 3/2015 | Li et al. | |
| 9,292,832 B2 | 3/2016 | Goel et al. | |
| 9,778,964 B1* | 10/2017 | Mowatt | G06F 9/542 |
| 2005/0154557 A1 | 7/2005 | Ebert | |
| 2005/0229183 A1 | 10/2005 | Araujo et al. | |
| 2007/0168917 A1 | 7/2007 | Janson | |
| 2011/0314389 A1* | 12/2011 | Meredith | G06F 8/60 715/751 |
| 2012/0072991 A1 | 3/2012 | Belani et al. | |
| 2014/0108943 A1 | 4/2014 | Lee et al. | |
| 2014/0259433 A1 | 9/2014 | Nunn et al. | |
| 2014/0282608 A1 | 9/2014 | Biancalana et al. | |
| 2014/0351790 A1 | 11/2014 | Ghose et al. | |
| 2015/0067154 A1* | 3/2015 | Ly | H04L 43/0876 709/224 |
| 2015/0296043 A1 | 10/2015 | Kim et al. | |
| 2016/0080500 A1* | 3/2016 | Penilla | H04W 4/046 709/226 |
| 2016/0110645 A1 | 4/2016 | Kim et al. | |
| 2016/0239352 A1* | 8/2016 | Evans | G06F 9/54 |
| 2016/0381163 A1 | 12/2016 | Mashtakov | |
| 2018/0081911 A1* | 3/2018 | Mowatt | G06F 8/60 |
| 2019/0384749 A1 | 12/2019 | Mowatt et al. | |

FOREIGN PATENT DOCUMENTS

| | | |
|---|---|---|
| EP | 1515229 A2 | 3/2005 |
| WO | 2008042984 A2 | 4/2008 |
| WO | 2015108748 A1 | 7/2015 |

OTHER PUBLICATIONS

"International Search Report and Written Opinion Issued in PCT Application No. PCT/US2017/051238", dated Dec. 11, 2017, 14 Pages.

"Consumer IoT—AppCarousel", Published on: Jan. 21, 2016, Available at: http://appcarousel.com/markets/consumer-iot/.

Babu, Jacob, "This is how IoT is going to change your everyday life", Published on: Nov. 26, 2015, Available at: http://www.attinadsoftware.com/blog/jacob-babu/how-iot-going-change-your-everyday-life%E2%80%A6.

"Funstore—An application store for Internet of Things", Published on: Jun. 27, 2015, Available at: https://funstore.io/.

"My Cell Phone Told My Alarm Clock I Have a Client Meeting This Morning", Published on: Sep. 25, 2015, Available at: https://www.icontrol.com/blog/my-cell-phone-told-my-alarm/.

Sodoma, Brian, "The Internet of Things (IoT): When your alarm clock talks, the coffee machine listens", Published on: May 2, 2016, Available at: http://www.azcentral.com/story/sponsor-story/best-buy/2016/05/02/best-buy-internet-of-things/83844056/.

Kanchibotla, et al., "Internet of Things—catalyst to intelligent decision making", Published on: Apr. 28, 2014, Available at: http://www.mu-sigma.com/analytics/thought_leadership/decision-sciences-Internet-of-Things.html.

"Smart Connected Solutions for the Internet of Things (IoT)", Retrieved on: May 11, 2016, Available at: http://www.nxp.com/applications/solutions-for-the-iot-and-adas/smart-connected-solutions-for-the-iot:SMART-CONNECTED-SOLUTIONS.

"The Bosch IoT Suite: Technology for a Connected World", Published on: Mar. 18, 2015, Available at: https://www.bosch-si.com/media/en/bosch_software_innovations/documents/brochure/products_2/bosch_iot_suite/brochure.pdf.

Jacobsen, et al., "Oracle Internet of Things Cloud Service is Now Available", Published on: Jan. 5, 2016, Available at: https://blogs.oracle.com/fusionmiddleware/entry/oracle_internet_of_things_cloud.

John, Rex ST, "App Stores are Coming to the Internet of Things", Published on: Jun. 19, 2015, Available at: https://blogs.intel.com/evangelists/2015/06/19/app-stores-are-coming-to-the-internet-of-things/.

Baral, Susmita, "Assistant App New Feature: Alarm Clock Now Offers Talking Alarm", Published on: Aug. 5, 2015, Available at: http://www.idigitaltimes.com/assistant-app-new-feature-alarm-clock-now-offers-talking-alarm-464355.

"Overview an End-to-End-open Standards based-Solution", Published on: Feb. 5, 2013, Available at: http://www.shaspa.com/overview/.

Kang, et al., "An Interactive Trust Model for Application Market of the Internet of Things", In Journal of IEEE Transactions on Industrial Informatics, vol. 10, Issue 2, May 2014, pp. 1516-1526.

Goodner, Marc, "Internet of Things—Develop an Azure-Connected IoT Solution in Visual Studio with C++", In MSDN Magazine, vol. 31, No. 4, Apr. 2016, 10 pages.

Vogler, et al., "A Scalable Framework for Provisioning Large-Scale IoT Deployments", In Journal of ACM Transactions on Internet Technology, vol. 16, Issue 2, Mar. 2016, 20 pages.

Verbelen, Tim, "Building the Internet of Things with OSGi", Published on: Feb. 2, 2016 Available at: https://jaxenter.com/building-the-internet-of-things-with-osgi-123620.html.

Guo, et al., "A study of middleware for pluggable UI in IoT-enabled environment", In Proceedings of the IEEE 11th International Conference on e-Business Engineering, Nov. 5, 2014, pp. 326-330.

Ha, et al., "A perspective on the IoT services through a multi-dimensional analysis", In Proceedings of the Conference on research in adaptive and convergent systems, Oct. 9, 2015, pp. 479-481.

Biswas, et al., "The Internet of Things: Impact and Applications in the High-Tech Industry", In White Paper of cognizant, Mar. 2015, pp. 1-11.

Khanna, et al., "The Internet of Things for Medical Devices—Prospects, Challenges and the Way Forward", In White Paper of Tata, May 1, 2015, pp. 1-12.

Adkins, et al., "Demo Abstract: Michigan's IoT Toolkit", In Proceedings of the 13th ACM Conference on Embedded Networked Sensor Systems, Nov. 1, 2015, pp. 485-486.

Blackstock, et al., "MAGIC Broker 2: An open and extensible platform for the Internet of Things", In Proceedings of Internet of Things, Nov. 29, 2010, 8 pages.

Lavars, Nick, "Luna smart mattress cover takes Internet of Things to bed", Published on: Jan. 27, 2015 Available at: http://www.gizmag.com/luna-smart-mattress-cover/35813/.

Sharma, Prashant, "Internet of Things 101: Understanding the Building Blocks of the Connected World", Published on: Jun. 14, 2014 Available at: https://www.microsoftventures.com/blog/entry/InternetofThings101UnderstandingtheBuildingBlocksoftheConnectedWorld%7C1064.

Madakam, Somayya, "Internet of Things: Smart Things", In International Journal of Future Computer and Communication, vol. 4, No. 4, Aug. 2015, pp. 250-253.

Crook, Jordan, "Poncho Launches an Alarm App So You Can Wake Up to Weather Forecasts", Published on: Feb. 2, 2016 Available at: http://techcrunch.com/2016/02/02/poncho-launches-an-alarm-app-so-you-can-wake-up-to-weather-forecasts/.

"Internet of Things—Oracle Cloud", In White Paper of Oracle, Retrieved on: May 6, 2015, 5 pages.

"International Search Report and Written Opinion issued in PCT Application No. PCT/US2017/051236," dated Dec. 12, 2017, 14 pages.

"Non Final Office Action Issued in U.S. Appl. No. 15/268,912", dated Feb. 23, 2017, 8 Pages.

"Preinterview First Office Action Issued in U.S. Appl. No. 15/268,930", dated Aug. 16, 2018, 5 Pages.

"Non Final Office Action Issued in U.S. Appl. No. 15/693,768", dated Feb. 5, 2018, 7 Pages.

"Final Office Action Issued in U.S. Appl. No. 15/693,768", dated Dec. 12, 2018, 7 Pages.

(56) References Cited

OTHER PUBLICATIONS

"Office Action Issued in European Patent Application No. 17772550. 4", dated Apr. 15, 2020, 7 Pages.
"Office Action Issued in European Patent Application No. 17780922. 5", dated Apr. 24, 2020, 8 Pages.

* cited by examiner

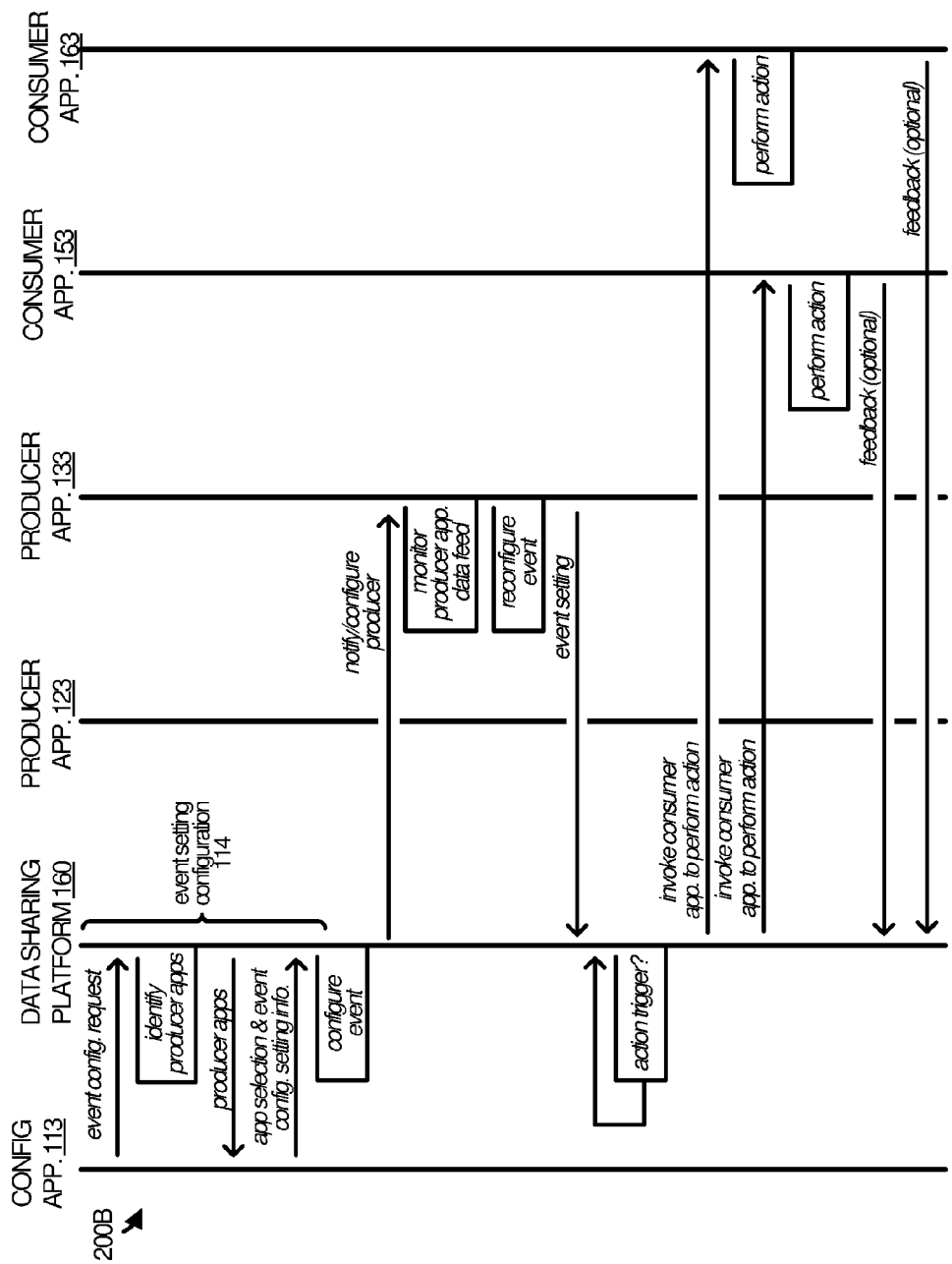

SYSTEMS AND METHODS FOR SHARING APPLICATION DATA BETWEEN ISOLATED APPLICATIONS EXECUTING ON ONE OR MORE APPLICATION PLATFORMS

CROSS-REFERENCE TO RELATED APPLICATIONS

This application is related to co-pending U.S. patent application Ser. No. 15/268,912, entitled "APPLICATION DATA SHARING AND DECISION SERVICE PLATFORM," and U.S. patent application Ser. No. 15/268,930, entitled "DEPLOYMENT OF APPLICATIONS CONFORMING TO APPLICATION DATA SHARING AND DECISION SERVICE PLATFORM SCHEMA," which were filed on Sep. 19, 2016, the contents of which are expressly incorporated by reference herein.

BACKGROUND

The Internet of Things (IoT) generally refers to the use of sensors, actuators, and communication technology embedded into physical objects such that the objects are enabled to be tracked or controlled over networks, e.g., the Internet. In almost all realms of our daily lives, devices are becoming increasingly internet-connected. From light switches to music players, from weather sensors to cattle monitors, a wealth of data is available when IoT devices provide rich information or when IoT device are controlled via the Internet.

In parallel, the application (or "app") store phenomena has led independent software vendors (ISVs) to create applications that can process various types data and user input ranging from traffic congestion apps, gate opening apps, messaging apps, music streaming and play list apps, and the like.

Unfortunately, these applications are generally disconnected or isolated from one another—even when operating on the same application platform or device. For example, a smartphone device may contain various downloaded apps that rarely, if ever, have the capability to talk to one another. A few vendors have developed applications designed to support non-user initiated interactions with other applications. However, these applications are limited in what triggers the interactions and what actions the applications are able to take in response to the triggers.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to dynamic sharing of application data among multiple isolated applications executing on one or more application platforms. In an implementation, a method of operating an application platform executing a validated third party application to consume application data generated by other validated third party applications executing on one or more application platforms is disclosed. The method includes receiving an instruction to invoke the validated third party application in a runtime environment. The instruction is generated by a data sharing and decision service platform based on one or more application data feeds provided by the other validated third party applications registered with the data sharing platform. The method further includes processing the instruction to automatically invoke the validated third party application in the runtime environment and, once the validated third party application is invoked, directing the validated third party application to perform the action. The instruction identifies the validated third party application to be invoked and configuration information associated with the action to be performed.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIGS. 2A-2C illustrates example sequence diagrams depicting example operations of various components of example operational architecture for facilitating sharing of application data among multiple isolated applications executing on one or more application platforms, according to some embodiments.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

The techniques described herein facilitate dynamic sharing of application data among multiple isolated applications executing on one or more application platforms through the use of a central data sharing platform. Among other capabilities, the central data sharing platform is configured to receive, combine, process and dynamically facilitate communication of the application data between applications registered with the system. Additionally, among other capabilities, application platforms are described that are configured to receive instructions, automatically invoke third party applications and direct those applications to perform particular actions.

At least one technical effect discussed herein is the ability for applications to dynamically communicate without limitations as to what triggers interactions or what actions the applications are able to take in response to the triggers.

Figure 1:
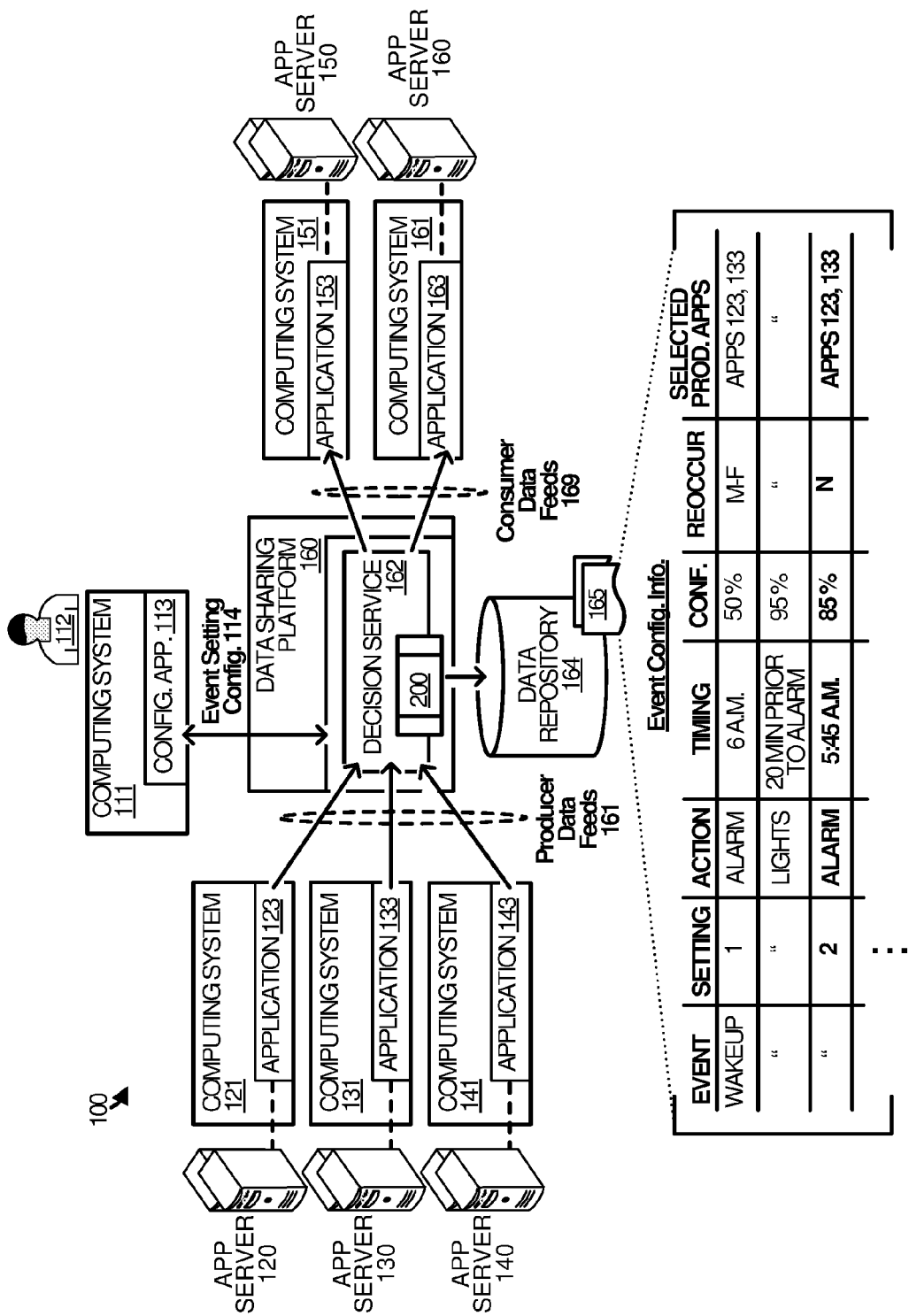
FIG. 1 depicts a block diagram illustrating an example operational architecture for sharing application data among multiple isolated applications executing on one or more application platforms (or computing systems), according to some embodiments.

FIG. 1 depicts a block diagram illustrating an example operational architecture 100 for sharing application data among multiple isolated applications executing on one or more application platforms (or computing systems), according to some embodiments. The example operational architecture 100 includes a single isolated application (e.g., producer, consumer, or configuration application) executing on each computing system. However, it may be appreciated that any number of isolated applications can execute on each computing system.

The example operational architecture 100 includes computing systems 111, 121, 131, 141, 151 and 161, a data sharing platform 160, and application ("app") servers 120, 130, 140, 150 and 160. The data sharing platform 160 includes a data repository 164. As shown in the example of FIG. 1, computing systems 121, 131 and 141 include producer applications 123, 133 and 143, respectively. Computing systems 151 and 161 include consumer applications 153 and 163, respectively. Although not shown, the producer applications 123, 133 and 143, and consumer applications 153 and 163 can each include an application program interface (API) representative of an interface through which the computing systems may communicate with the data sharing platform 160—or directly with each other in some instances. Among other implementations, the API may be an add-in application that runs in the context of a producer application or consumer application, an integrated component of the application, or a component of an operating system or some other application on a computing system.

The data sharing platform 160 is representative of a service or collection or services that facilitates sharing of application data feeds among otherwise isolated applications that are registered. Among other functions, the data sharing platform 160 includes a decision service 162 comprising a predictive analysis engine (not shown) capable of processing producer data feeds 161, blending the feeds, and automatically configuring or reconfiguring event configuration information for the consumer applications.

The data sharing platform 160 may include server computers, blade servers, rack servers, and any other type of computing system (or collection thereof) suitable for carrying out or facilitating sharing of application data feeds among otherwise isolated applications as described herein. Such systems may employ one or more virtual machines, containers, or any other type of virtual computing resource in the context of supporting enhanced group collaboration of which computing system 1101 is representative.

Computing systems 111, 121, 131, 141, 151 or 161, are representative of any computing devices suitable for employing applications 113, 123, 133, 143, 153 and 163. Examples include desktop and laptop computers, tablets, smart phones, smart televisions, wearable devices (watches, glasses, etc.), and any other type of IoT device, of which computing system 1101 is also representative.

Referring still to FIG. 1, configuration application 113 executes on computing system 111. As discussed herein, the configuration application 113 may be optional or may execute on another of computing system, 121, 131, 141, 151 or 161, in addition or in lieu of one or more other applications. The configuration application 113 can be representative of any application designed to configure event configuration information for one or more other consumer applications. The configuration application 113 may be a natively installed and executed application, a browser-based application, a mobile application, a streaming or streamed application, or any other type or application, variation, or combination thereof. The configuration application 113 can also be part of an application suite consisting of multiple applications that are bundled together.

The applications 113, 123, 133, 143, 153 and 163 execute on computing system, 121, 131, 141, 151 or 161. As shown in the example of FIG. 1, the producer applications 123, 133 and 143 can be representative of any applications designed to share data with other applications. For example, the producer applications 123, 133 and 143 can provide application data feeds to the data sharing platform 160. Likewise, the consumer applications 153 and 163 can be representative of any applications designed to utilize shared data generated by other, otherwise isolated, applications. The applications 113, 123, 133, 143, 153 and 163 may be a natively installed and executed application, a browser-based application, a mobile application, a streaming or streamed application, or any other type or application, variation, or combination thereof. The applications 113, 123, 133, 143, 153 and 163 can also be part of an application suite consisting of multiple applications that are bundled together.

The app servers 120, 130, 140, 150 and 160 may expose logic through a component API, such as, for example, the Enterprise JavaBean (EJB) component model found on Java 2 Platform, Enterprise Edition (J2EE) application servers. Additionally, the application servers 120, 130, 140, 150 and 160 may manage the own resources. The gate-keeping duties can include, but are not limited to, security, transaction processing, resource pooling, and messaging. The app servers may also employ various scalability and fault-tolerance techniques.

The applications (application server clients) can include GUIs (graphical user interface) running on a PC, mobile phone device, a Web server, or even other application servers. The information traveling back and forth between an application server and its app server client is not restricted to simple a particular display markup. Instead, the information is program logic that can take the form of data and method calls, the application server client can employ the exposed business logic in any manner that is suitable.

Prior to operation, applications 123, 133, 143, 153 and 163 register with the data sharing platform 160. For example, the applications 123, 133, 143, 153 and 163 can register by providing registration identification information to the data sharing platform 160. The registration identification information can include, for example, a user identifier or some other identification information that may be used by the data sharing platform 160 to correlate and subsequently identify related applications that are registered with the data sharing platform 160. The registration identification information may be stored in data repository 164.

The registration identification information can also include application identification information that may be used by the data sharing platform 160 to identify input or output capabilities of the application. The input capabilities can indicate the types of data feeds that the application can use while the output capabilities indicate the types of data feeds that the application can produce. Although not shown in the example of FIG. 1, in some embodiments, an application can be both a producer application and a consumer application.

Assuming the producer applications 123, 133, and 143 and the consumer applications 153 and 163 have previously registered with the data sharing platform 160, the configuration application 113 is used to set event configuration information for one or more other consumer applications. The configuration can include setting information for an event. The event configuration information may include an event setting identifies one or more actions to be executed by one or more consumer applications and timing information indicating when the one or more actions are to be executed. As discussed herein, in some embodiments the configuration application 113 may be optional. In such instances, event settings may be configured by, for example, consumer applications 153 and 163 or producer applications 123, 133, and 143.

The data sharing platform 160 may store the event configuration information in data repository 164. As illustrated in the example of FIG. 1, a manifest 165 is generated for each event configuration information entry (or instance). By way of example, FIG. 1 illustrates a "wakeup" event including event settings that identifies one or more actions to be executed by a light control consumer application 153 and an alarm application 163 and timing information indicating when the lights are to be turned on and the alarm is supposed to execute. A confidence level (or percentage) associated with each setting (or action) is determined by the decision service 162. As discussed herein, the confidence level may be used to identify the correct setting when multiple actions are set to trigger (or execute) within the same time window or frame.

Additionally, related producer applications can be identified and selected. For example, the data sharing platform can utilize a registration identifier included with a configuration request to identify other applications that are registered with the data sharing platform with the same registration identifier (e.g., same user). The other application may be executing on one or more different application platforms (including on the same application platform as a consumer application). As discussed herein, the identified applications may then be filtered such that only compatible applications are provided for selection (e.g., by a user of the registration application 113).

The compatible applications may be identified for each consumer application based on producer applications whose output capabilities match the input capabilities of the particular consumer application. As discussed herein, during the validation stage, application developers must provide the input capabilities of the application which can indicate the types of data feeds that the application can use and the output capabilities which can indicate the types of data feeds that the application can produce. Although not shown in the example of FIG. 1, in some embodiments, an application can be both a producer application and a consumer application.

In some embodiments, there may be multiple versions (e.g., v2.0, v2.1, etc.) of a data sharing platform, e.g., data sharing platform 160. A schema defines the capabilities that are available in each version of the data sharing platform and applications can self-declare, e.g., via a manifest, which capabilities are utilized during operation. If, for example, the application intends to use capabilities that are not available on a particular version of the data sharing platform then the application may be blocked from installation on that version of the platform. In this manner, incompatible applications may be blocked from installing on a particular platform or version of a platform.

As shown in the example of FIG. 1, multiple actions are configured for a "wakeup" event. Specifically, an initial or first setting of the event configuration information an alarm action is set to be triggered via an alarm application, e.g., application 163, and a lights action is set to be trigger via a smart light switch operator application, e.g., application 153. Additionally, producer applications 123 and 133 are selected as being producer applications associated with the alarm and lights actions.

As discussed herein, the decision service 162 includes a predictive analysis engine (not shown) capable of processing the producer data feeds 161, blending the feeds, and automatically configuring or reconfiguring event configuration information for the consumer applications 153 and 163. The decision service 162 generates consumer data feeds 169 which may be raw or filtered producer data feeds 161, one or more instructions or API calls to the consumer applications 153 and 163, or some combination or variation thereof. Likewise, producer data feeds 161 can be raw data feeds that are processed by the decision service 162, API calls to configure (or reconfigure) the event configuration information or some combination or variation thereof.

Figure 2A:
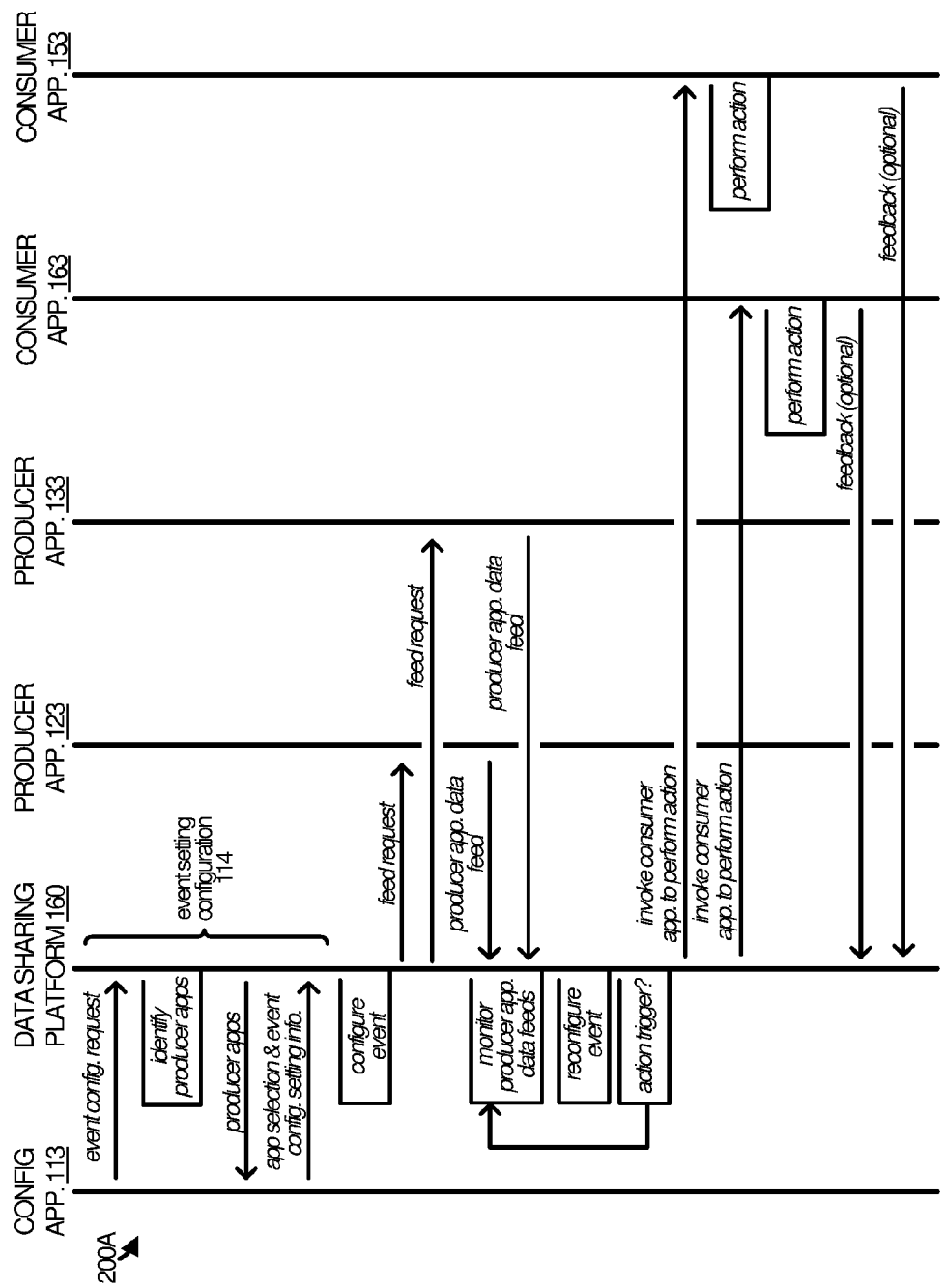
Figure 2C:
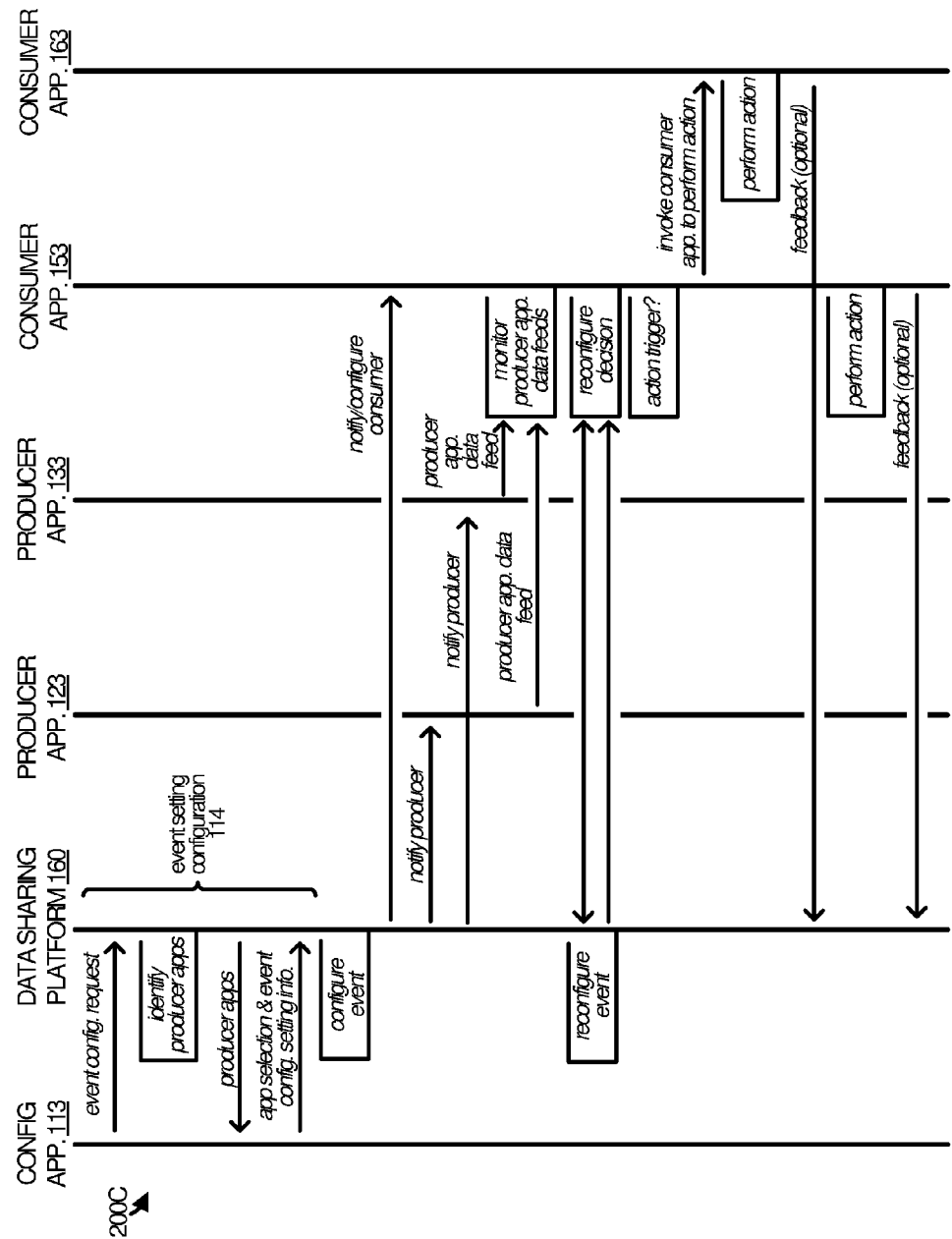

To further illustrate the operation of example operational architecture 100, FIGS. 2A-2C are provided.

FIGS. 2A-2C illustrates example sequence diagrams 200A-200C depicting example operations of various components of example operational architecture 100 of FIG. 1 for facilitating sharing of application data among multiple isolated applications executing on one or more application platforms, according to some embodiments. The sequence diagrams 200A-200C include configuration application 113, data sharing platform 160 (including decision service 162), producer application 123, producer application 133, consumer application 153 and consumer application 163. Additional or fewer components of the example operation architecture 100 are possible.

As discussed herein, prior to operation, application developers submit their applications to an application store (not shown) along with application capability information. Additionally, in some embodiments, applications can be pre-loaded into an instance of the platform. For example, a hardware manufacturer of a home waking service may submit and/or otherwise associate or pre-install certain complementary applications. The application capability can include input capabilities of the application indicating the types of application data feeds that the application can use (or receive) and output capabilities that indicate the types of application data feeds that the application can produce (or provide). Additionally, during the application submission process, the application can be assigned or provided an application identifier (ID).

The application is subsequently downloaded and registered with the data sharing platform 160. For example, the applications can register by providing registration identification information to the data sharing platform 160. The registration identification information can include a user identifier or some other identification information that may be used by the data sharing platform 160 to correlate and subsequently identify related applications that are registered with the data sharing platform 160. The registration identification information also includes an application ID that can be used to identify input and output capabilities of the application.

Referring first to the example operational sequence 200A of FIG. 2A, in operation, a user 112 configures an event via the configuration application 113. Initially, the configuration application 113 sends an event configuration request to the data sharing platform 160. As discussed herein, the event configuration request includes registration identification information that include one or more application identifiers and a user (or account) identifier. In the examples of FIGS. 2A-2C, the registration information includes application identifiers for consumer applications 153 and 163.

The data sharing platform 160 uses the user identifier to identify a set of other applications, e.g., producer applications, that are registered with the data sharing platform 160 with the same registration identifier (e.g., user identifier). The data sharing platform 160 uses the one or more application identifiers to filter the identified producer applications in order to identify a subset of producer applications that are compatible with each of one or more consumer applications 153 and 163. Identification or description of the subset(s) of producer applications are then provided to the user via the configuration application 113. The user 112 can select the one or more relevant producer applications for monitoring via the configuration application 113.

As shown in the example of FIGS. 2A-2C, producer applications 123 and 133 are selected by the user of the configuration application 113. The data sharing platform 160 associates the selected producer applications 123 and 133 with the event. For the purposes of discussion, producer application 123 can be a Weather data application such as, for example, The Weather Channel® Application capable of providing weather data based on a predetermined or current location. The producer application 133 can be a IoT hub device capable of measuring and/or otherwise detecting user sleep patterns, and producer application 143 can be a Traffic data application. Although not shown, the producer applications could also be a Calendaring application such as, for example, Microsoft Outlook®, or a variety of other applications, IoT applications, etc. Likewise, consumer application 153 can be a lights control consumer application 153 capable of, for example, controlling Philips IoT lightbulbs, e.g., in the user's bedroom during the wakeup event.

The user also provides event configuration setting for configuration of the event. The event configuration setting identifies one or more actions to be executed by one or more consumer applications and timing information indicating when the one or more actions are to be executed. For example, as shown in the example of FIG. 1, a "wakeup" event is shown including event settings that identify one or more actions to be executed. More specifically, a lights action is to be executed by a lights control consumer application 153 and an alarm action is to be executed by an alarm application 163. The timing associated with the actions is also provided.

The data sharing platform 160 configures the event in accordance with the received event configuration setting and generates a manifest 165 for the event. The data sharing platform 160 can also calculate a confidence level associated with the event configuration setting and/or one or more actions indicated by the event configuration setting.

By way of example, FIG. 1 illustrates a "wakeup" event including a first event setting that identifies one or more actions to be executed by a light control consumer application 153 and an alarm application 163 and timing information indicating when the lights are to be turned on and the alarm is supposed to execute. A confidence level (e.g., percentage) associated with each setting (or action) is determined by the decision service 162. As discussed herein, the confidence level may be used to identity the correct setting when multiple actions are set to trigger (or execute) within the same time window or frame.

Once configured, the data sharing platform 160 can obtain producer application data feeds in a number of ways. For example, the producer application data feeds can be pushed to the data sharing platform 160 or the data sharing platform 160 can periodically query the producer applications 123 and 133 for the data feeds or directly read the data from the producer applications 123 and 133, e.g., pull the producer data feeds.

As shown in the example of FIGS. 2A-2C, the data sharing platform 160 sends application data feed requests to producer applications 123 and 133. The producer applications 123 and 133, in turn, provide producer application data feeds to the data sharing platform 160. The producer application data feeds can be provided periodically, based on changes to the data or other triggering events, responsive to requests or queries or in other manners, including combinations or variations thereof.

The data sharing platform 160 monitors the producer application data feeds provided by the producer applications 123 and 133 associated with the event. In the course of monitoring the producer application data feeds, the data sharing platform 160 detects an event reconfiguration trigger based on the one or more application data feeds. Responsive to the event reconfiguration trigger, the data sharing platform 160 automatically modifies the event configuration information. The modification of the event configuration information can be made dynamically based on one or more machine learning models of a predictive analysis engine (not shown). The predictive analysis engine can be included as part of decision service 162.

In some embodiments, modifying the event configuration information can include generating an additional event setting for the event based on content of the one or more application data feeds and calculating a confidence level associated with the additional event setting. As shown in the example of FIG. 1, the additional event setting (e.g., setting 2) includes new alarm action with new timing information for the wakeup event. In the example of FIG. 1, a confidence level is also calculated for the addition event setting. For example, the setting 2 alarm has a confidence of 85% while the setting 1(original setting) has a confidence of 50%. The data sharing platform 160 can determine that the event configuration information includes multiple event settings each identifying a same action, e.g., Alarm, to be executed within a window of time, e.g., between 5 A.M. and 6 A.M. and automatically select the event setting having a highest confidence level, e.g., setting 2. Accordingly, the Alarm timing information can be dynamically modified based on the producer data feeds 161.

The data sharing platform 160 continuously monitors timing information corresponding to configured events identified by the event configuration information to determine if one or more actions are set to execute. If so, the data sharing platform 160 directs the appropriate application platform(s) to invoke the consumer application(s) and perform the actions.

The consumer applications can optionally provide feedback to the data sharing platform which can be utilized by the data sharing platform 160 and, more particularly, decision service 162, to enhance the dynamic event reconfiguration. The feedback can take the form of telemetry data that is provided to the decision service 162 and/or application developers so that interaction patterns between applications can be better understood. Additionally, default behavior can be improved. For example, if the lights an IoT device could have an abort button on the device which, when pressed, can inform the decision service 162 that the action just taken was not appreciated (e.g. the lights were turned on too early). The data sharing platform 160 can adjust one or more machine learning models of the predictive analysis engine based on the feedback. For example, the feedback could result in a decrease of the preference rating for that same action in the future. This feedback data can also be used to improve algorithmic machine learning models across the user base of the data sharing platform 160 so that other users can also benefit from the enhanced system knowledge.

The example sequence diagrams 200B and 200C shown in FIGS. 2B and 2C, respectively, are similar to sequence diagram 200A with the exception that in sequence diagram 200B, producer application 133 is configured with additional functionality for monitoring at least its own producer application data feeds and automatically reconfiguring event configuration information by generating new event settings (or information) for one or more actions and providing the event setting to the data sharing platform 160. In some embodiments, the reconfiguration of event configuration information can include calculating a confidence level associated with the new event setting. Likewise, in sequence diagram 200C, consumer application 153 is configured with additional functionality for monitoring producer application data feeds and automatically reconfiguring event configuration information. Additionally, in the example of FIG. 2C, consumer application 153 automatically invokes consumer application 163 to perform an action.

Figure 3:
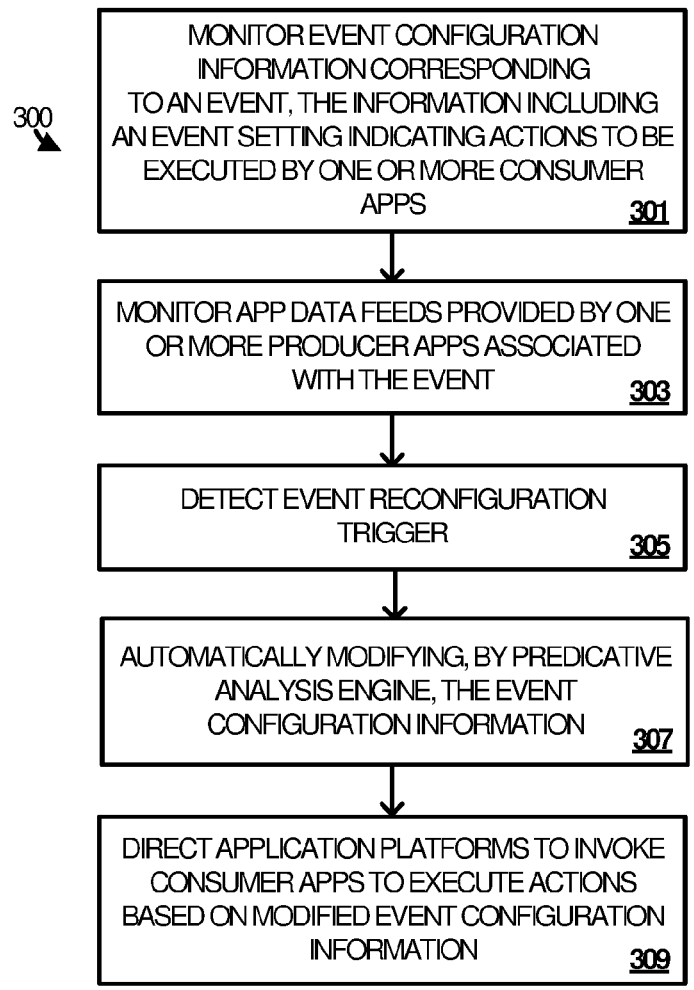
FIG. 3 depicts a flow diagram illustrating example operations of a decision service for sharing application data among multiple isolated applications executing on one or more application platforms, according to some embodiments.

FIG. 3 depicts a flow diagram illustrating example operations 300 of a decision service for sharing application data among multiple isolated applications executing on one or more application platforms, according to some embodiments. The example operations 300 may be performed in various embodiments by decision service 162 of FIG. 1, or one or more processors, modules, engines, components or tools of a data sharing platform 160 of FIG. 1.

To begin, at 301, the decision service monitors event configuration information corresponding to an event. As discussed herein, the event configuration information can include an event setting that identifies one or more actions to be executed by one or more consumer applications and timing information indicating when the one or more actions are to be executed.

At 303, the decision service monitors application data feeds provided by one or more producer applications associated with the event and, at 305, detects an event reconfiguration trigger based on the one or more application data feeds. For example, the event reconfiguration trigger can be caused by one or more predicted patterns as determined by the machine learning models of the predictive analysis engine.

Responsive to the event reconfiguration trigger, at 307, the decision service automatically modifies the event configuration information. More specifically, a predictive analysis engine of the decision service processes producer data feeds 161 and, in some instances, utilizes the machine learning algorithms to modify the event configuration.

Lastly, at 309, the decision service directs at least one of the one or more application platforms to invoke at least one of the one or more data consumer applications for execution of at least one of the one or more actions based, at least in part, on the modified event configuration information.

Figure 4:
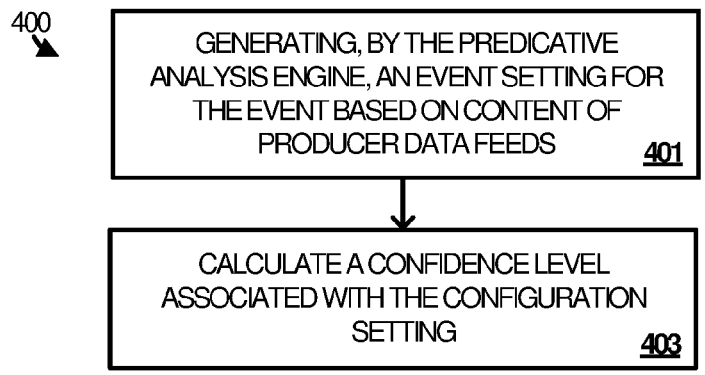
FIG. 4 depicts a flow diagram illustrating example operations of a decision service for modifying the event configuration information, according to some embodiments.

FIG. 4 depicts a flow diagram illustrating example operations 400 of a decision service for modifying the event configuration information, according to some embodiments. The example operations 400 may be performed in various embodiments by decision service 162 of FIG. 1, or one or more processors, modules, engines, components or tools of a data sharing platform 160 of FIG. 1.

To begin, at 401, the decision service generates an event setting for the event based on content of the producer data feeds. For example, as illustrated in the example of FIG. 1, a second setting (#2) is generated for the alarm action based on the producer data feeds 161. The action is to be executed once (i.e., does not reoccur) at 5:45 A.M. because the system has detected, for example, bad traffic, weather conditions, etc., based on the producer data feeds 161. Alternatively or additionally, the IoT hub may detect that sleeping patterns indicate that a user has had enough sleep or is otherwise ready to wake up. Although not shown, the system could also push the timing of the alarm back to say 6:15 A.M. if certain criteria are met.

Figure 5:
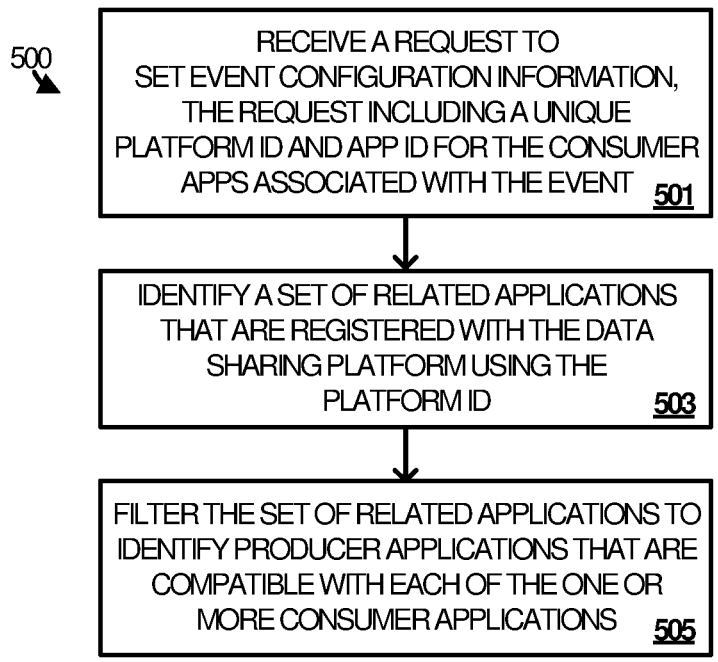
FIG. 5 depicts a flow diagram illustrating example operations of a decision service for identifying producer applications that are compatible with consumer applications during an event setting configuration, according to some embodiments.

FIG. 5 depicts a flow diagram illustrating example operations 500 of a decision service for identifying producer applications that are compatible with consumer applications during an event setting configuration, according to some embodiments. The example operations 500 may be performed in various embodiments by decision service 162 of FIG. 1, or one or more processors, modules, engines, components or tools of a data sharing platform 160 of FIG. 1.

To begin, at 501, the decision service receives a request to set event configuration information associated with an event. The request can include a platform identifier that uniquely identifies a user or account with the data sharing platform. Additionally, the request can include one or more application identifiers that identify one or more consumer applications associated with the event.

At 503, the decision service identifies a set of related applications that have registered with the data sharing platform using the unique platform identifier.

At 505, the decision service filters the set of related applications to identify producer applications that are compatible with the one or more consumer applications. In some embodiments, the filtering the applications to identify the producer applications that are compatible with each of the one or more consumer applications can include identifying input capabilities of a consumer application, identifying output capabilities of the set of related applications that have registered with the data sharing platform using the unique platform identifier, and selecting producer applications with output capabilities that match the input capabilities of the consumer application. The filtered applications are the producer applications that are compatible with the consumer application. In some embodiments, a group of applications can be selected for each consumer application associated with the event being configured.

Although not shown in the example of FIG. 5, the decision service can provide the compatible producer applications to the configuration application for a user or configuration selection. In this manner, a user or configuration application can identify a subset of the compatible producer applications whose application data feeds should be monitored for the event.

Figure 6:
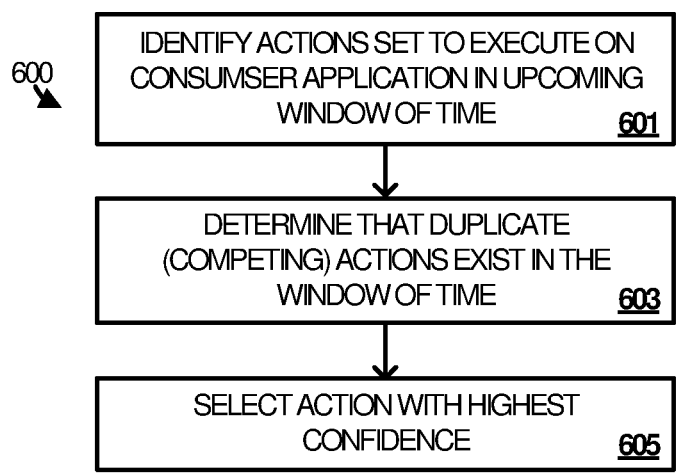
FIG. 6 depicts a flow diagram illustrating example operations of a decision service for identifying producer applications that are compatible with consumer applications during an event setting configuration, according to some embodiments.

FIG. 6 depicts a flow diagram illustrating example operations 600 of a decision service for identifying producer applications that are compatible with consumer applications during an event setting configuration, according to some embodiments. The example operations 600 may be performed in various embodiments by decision service 162 of FIG. 1, or one or more processors, modules, engines, components or tools of a data sharing platform 160 of FIG. 1.

To begin, at 601, the decision service identifies actions associated with an event that are set to execute in an upcoming window of time. The window of time can be a preconfigured window of time, dynamically selectable by the decision service, or determined in a variety of other manners including combinations or variations thereof. At 603, the decision service determines that duplicate (or competing) actions/settings exist for the same event in the same window of time and, at 605, selects the action with the highest confidence level.

For example, as shown in the example of FIG. 1, first configuration setting with an alarm action or component set to execute at 6 A.M. with a confidence level of 50% and a second configuration setting with an alarm action or component set to execute at 5:45 A.M. with a confidence level of 85%. The data sharing platform 160 can determine that the event configuration information includes multiple event settings each identifying a same action, e.g., Alarm, to be executed within a window of time e.g., between 5 A.M. and 6 A.M. Accordingly, the data sharing platform 160 can select the action with the highest confidence, e.g., the alarm from the second setting.

Figure 7:
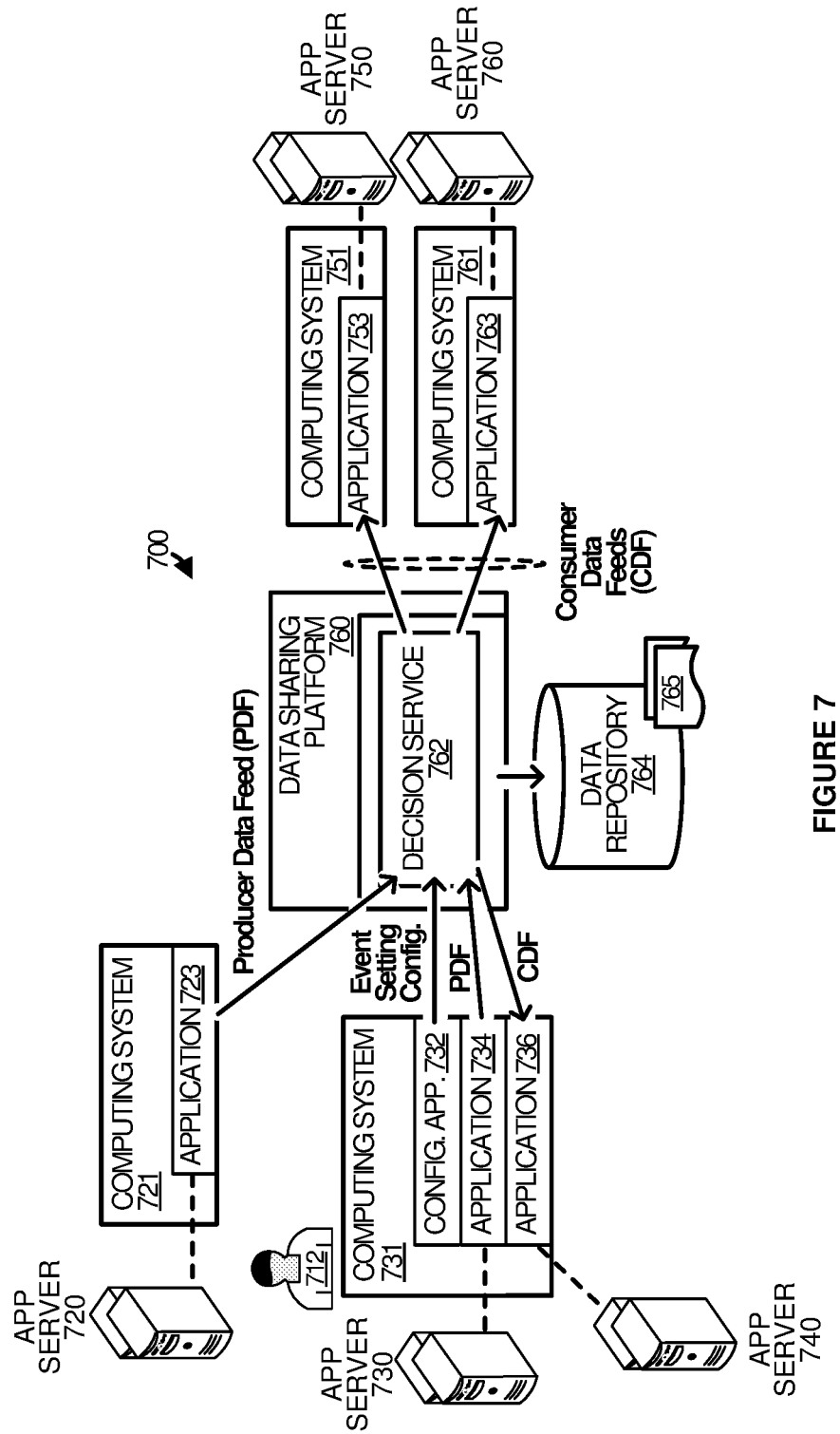
FIG. 7 depicts a block diagram illustrating an example operational architecture for sharing application data among multiple isolated applications executing on one or more application platforms (or computing systems), according to some embodiments.

FIG. 7 depicts a block diagram illustrating an example operational architecture 700 for sharing application data among multiple isolated applications executing on one or more application platforms (or computing systems), according to some embodiments. More specifically, the example operational architecture 700 is similar to the example operational architecture 100 of FIG. 1, but illustrates an embodiment whereby otherwise isolated applications, including a configuration application 732, coexist with other applications on the same computing system and, in some instances, in the same runtime environment. The applications are able to share application data via a data sharing platform 760.

The example operational architecture 700 includes computing systems 721, 731, 751 and 761, a data sharing platform 760, and application ("app") servers 120, 130, 140, 150 and 160. The data sharing platform 760 can be the data sharing platform 160 of FIG. 1, although alternative configurations are possible.

As shown in the example of FIG. 7, producer application 723 executes on computing system 721, configuration application 732, producer application 734, and consumer application 736 execute on computing system 731, application 753 executes on computing system 751 and application 763 executes on computing system 761. The computing systems 721, 731, 751 and 761 can be computing systems 121, 131, 151, and 161, of FIG. 1, respectively, although alternative configurations are possible. Likewise, producer, consumer and configuration applications can operate in the same or similar manner to the operation as discussed with reference to the example of FIG. 1.

Figure 8:
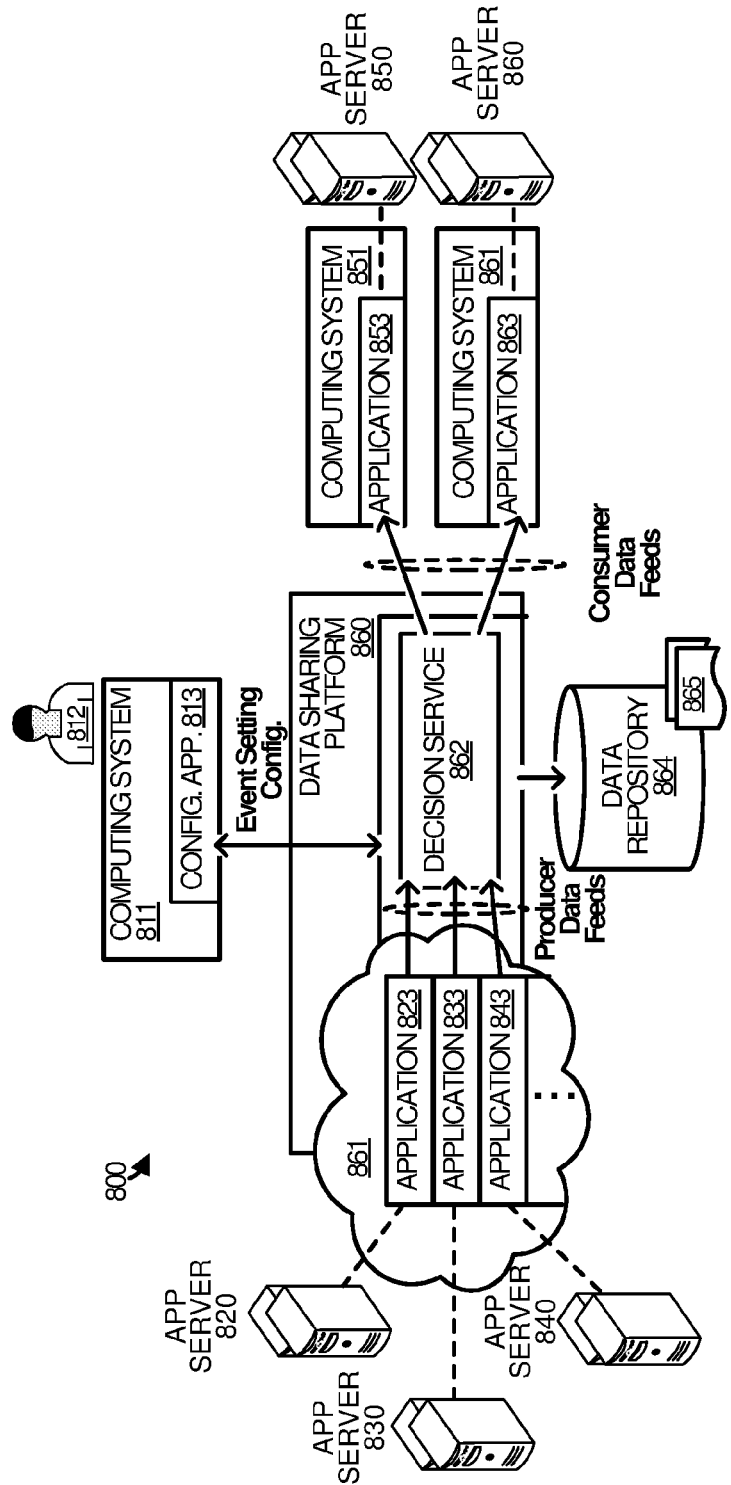
FIG. 8 depicts a block diagram illustrating an example operational architecture for sharing application data among multiple isolated applications, including cloud-based applications, executing on one or more application platforms (or computing systems), according to some embodiments.

FIG. 8 depicts a block diagram illustrating an example operational architecture 800 for sharing application data among multiple isolated applications, including cloud-based applications, executing on one or more application platforms (or computing systems), according to some embodiments. The example operational architecture 800 is similar to the example operational architecture 100 of FIG. 1, but illustrates an embodiment whereby various producer applications 823, 833, and 843 are executed on behalf of user 812 on a processing system in cloud 861. Cloud 861 may be part of the data sharing platform or a distinct component of operational architecture 800.

The example operational architecture 800 includes computing systems 813, 851 and 861, a data sharing platform 860, and application ("app") servers 820, 830, 840, 850 and 860. The data sharing platform 860 can be the data sharing platform 160 of FIG. 1, although alternative configurations are possible.

As shown in the example of FIG. 8, producer applications 823, 833, and 843 execute on a processing (or application system) in cloud 861 after being configured by user 812. For example, user 812 can configure a Weather app 823 to provide weather information based on a fixed location of the user. Alternatively, the location of the user 812 can be periodically sent to the cloud-based application. The producer applications 823, 833, and 843 can provide producer data feeds to the decision service 862. The producer, consumer and configuration applications can operate in the same or similar manner to the operation as discussed with reference to the example of FIG. 1.

Figure 9:
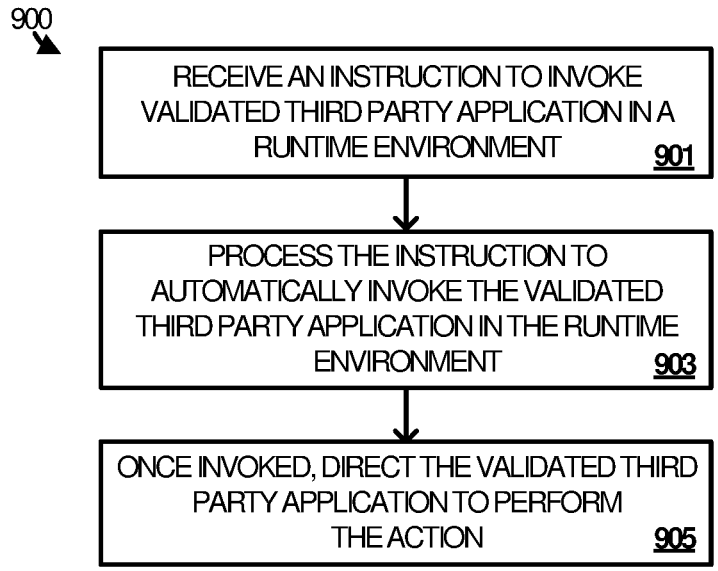
FIG. 9 depicts a flow diagram illustrating example operations of an application platform executing a validated third party application to consume application data generated by other validated third party applications executing on one or more application platforms, according to some embodiments.

FIG. 9 depicts a flow diagram illustrating example operations 900 of an application platform executing a validated third party application to consume application data generated by other validated third party applications executing on one or more application platforms, according to some embodiments. The example operations 900 may be performed in various embodiments by a computing system executing a consumer application such as, for example, computing system 151 or 161 executing application 153 and 163 of FIG. 1, respectively, or one or more processors, modules, engines, components or tools of a computing system.

As discussed above, prior to operation, the third party application is downloaded from a download portal of an application deployment system, e.g., public or private app store, or other organizational deployment. The third party application then registers with the data sharing platform and decision service platform, e.g., data sharing platform 160 of FIG. 1. The registration can include sending a registration request to the data sharing and decision service platform.

The registration request may include a unique platform identifier and an application identifier.

To begin, at 901, the application platform, on which a validated third party application is installed, receives an instruction to invoke the validated third party application in a runtime environment. The instruction may be generated by a data sharing and decision service platform, e.g., data sharing platform 160 of FIG. 1, based on one or more application data feeds, e.g., producer data feeds 161, provided by the other validated third party applications registered with the data sharing platform, e.g., applications 123, 133, and 143. In some embodiments, the instruction can be an application program interface (API) call.

At 903, the application platform processes the instruction to automatically invoke the validated third party application in the runtime environment. The instruction may identify the validated third party application to be invoked and configuration information associated with the action to be performed.

In some embodiments, the configuration information associated with the action to be performed may include a modification to existing event setting information. The existing event setting information may include an associated confidence level. Although not shown, the application platform may identify a confidence level associated with the modification to the existing event setting information, and modify the existing event setting information if the confidence level associated with the modification to the existing event setting information is higher than the confidence level associated with the existing even setting information.

Lastly, once the validated third party application is invoked, at 905, the application platform directs the validated third party application to perform the action.

Figure 10:
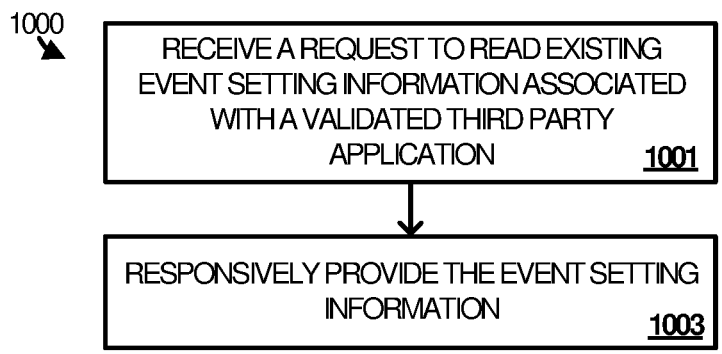
FIG. 10 depicts a flow diagram illustrating example operations of an application platform executing a validated third party application to consume application data generated by other validated third party applications executing on one or more application platforms, according to some embodiments.

FIG. 10 depicts a flow diagram illustrating example operations 1000 of an application platform executing a validated third party application to consume application data generated by other validated third party applications executing on one or more application platforms, according to some embodiments. The example operations 1000 may be performed in various embodiments by a computing system executing a consumer application such as, for example, computing system 151 or 161 executing application 153 and 163 of FIG. 1, respectively, or one or more processors, modules, engines, components or tools of a computing system.

To begin, the application platform receives a request to read existing event setting information associated with the validated third party application. The request may be an API call or request for information such as, for example, alarm configuration information. Responsive to the request, at 1003, the application platform provides the existing event setting information.

Figure 11:
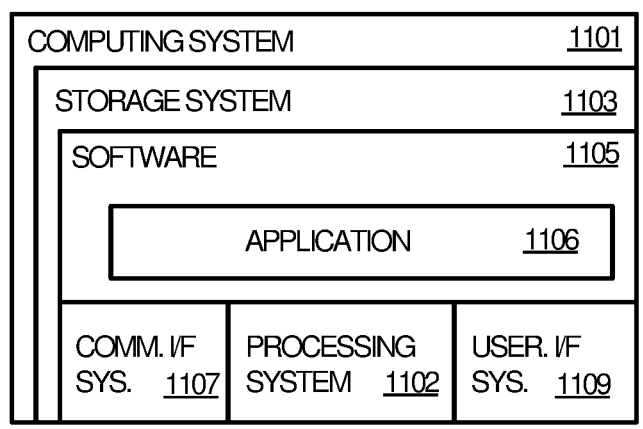
FIG. 11 is a block diagram illustrating a computing system suitable for implementing the scope-based certificate deployment technology disclosed herein, including any of the applications, architectures, elements, processes, and operational scenarios and sequences illustrated in the Figures and discussed below in the Technical Disclosure.

FIG. 11 illustrates computing system 1101, which is representative of any system or collection of systems in which the various applications, services, scenarios, and processes disclosed herein may be implemented. For example, computing system 1101 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 1101 may be implemented as a single apparatus, system, or device or may be implemented in a distributed manner as multiple apparatuses, systems, or devices. Computing system 1101 includes, but is not limited to, processing system 1102, storage system 1103, software 1105, communication interface system 1107, and user interface system 1109. Processing system 1102 is operatively coupled with storage system 1103, communication interface system 1107, and an optional user interface system 1109.

Processing system 1102 loads and executes software 1105 from storage system 1103. When executed by processing system 1102 for deployment of scope-based certificates in multi-tenant cloud-based content and collaboration environments, software 1105 directs processing system 1102 to operate as described herein for at least the various processes, operational scenarios, and sequences discussed in the foregoing implementations. Computing system 1101 may optionally include additional devices, features, or functionality not discussed for purposes of brevity.

Referring still to FIG. 11, processing system 1102 may comprise a micro-processor and other circuitry that retrieves and executes software 1105 from storage system 1103. Processing system 1102 may be implemented within a single processing device, but may also be distributed across multiple processing devices or sub-systems that cooperate in executing program instructions. Examples of processing system 1102 include general purpose central processing units, application specific processors, and logic devices, as well as any other type of processing device, combinations, or variations thereof.

Storage system 1103 may comprise any computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device, but may also be implemented across multiple storage devices or sub-systems co-located or distributed relative to each other. Storage system 1103 may comprise additional elements, such as a controller, capable of communicating with processing system 1102 or possibly other systems.

Software 1105 may be implemented in program instructions and among other functions may, when executed by processing system 1102, direct processing system 1102 to operate as described with respect to the various operational scenarios, sequences, and processes illustrated herein. For example, software 1105 may include program instructions for directing the system to perform the processes described with reference to FIGS. 3-6.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software, virtual machine software, or application software. Software 1105 may also comprise firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system. Indeed, encoding software on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1109 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1109. In some cases, the input and output devices may be combined in a single device, such as a display capable of displaying images and receiving touch gestures. The aforementioned user input and output devices are well known in the art and need not be discussed at length here. In some cases, the user interface system 1109 may be omitted when the computing system 1101 is implemented as one or more server computers such as, for example, blade servers, rack servers, or any other type of computing server system (or collection thereof).

User interface system 1109 may also include associated user interface software executable by processing system 1102 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating an application platform executing a consumer application to consume application data generated by one or more producer applications, the method comprising:
   receiving, by the application platform, an instruction to invoke the consumer application in a runtime environment,
   wherein the instruction is generated by a data sharing platform based on one or more application data feeds generated by the one or more producer applications registered with the data sharing platform;

processing the instruction to automatically invoke the consumer application in the runtime environment, wherein the instruction identifies the consumer application to be invoked and configuration information associated with an action to be performed by the consumer application, wherein the configuration information includes a modification to existing event setting information ; and once the consumer application is invoked, directing the consumer application to perform the action.

2. The method of claim 1, further comprising:

identifying a confidence level associated with the modification to the existing event setting information, wherein the confidence level comprises a value indicative of a confidence that the modification to the existing event setting information is correct; and modifying the existing event setting information if the confidence level associated with the modification to the existing event setting information is higher than a confidence level associated with the existing event setting information.

3. The method of claim 1, wherein the instruction comprises an application program interface (API) call.

4. The method of claim 1, further comprising:

downloading the consumer application from a download portal of an application deployment system; and registering the consumer application with the data sharing platform.

5. The method of claim 4, wherein registering the consumer application with the data sharing platform comprises: sending a registration request to the data sharing platform that includes a unique platform identifier and an application identifier.

6. The method of claim 5, further comprising: resetting the configuration information associated with the action to be performed after the action is performed.

7. The method of claim 1, further comprising: receiving a request to read the existing event setting information associated with the consumer application; and responsive to receiving the request, providing the existing event setting information.

8. A computing system comprising: one or more non-transitory computer readable storage media; a processing system operatively coupled with the one or more computer readable storage media; and program instructions stored on the one or more computer readable storage media for facilitating a communication exchange environment that, when executed by the processing system, direct the processing system to at least: receive an instruction to invoke a consumer application in a runtime environment, wherein the instruction is generated by a data sharing platform based on one or more application data feeds generated by one or more producer applications registered with the data sharing platform: processing the instruction to automatically invoke the consumer application in the runtime environment, wherein the instruction identifies the consumer application to be invoked and configuration information associated with an action to he performed by the consumer application, wherein the configuration information includes a modification to existing event setting information; and once the consumer application is invoked, direct the consumer application to perform the action.

9. The system of claim 8, wherein the program instructions, when executed by the processing system, further direct the processing system to: identify a confidence level associated with the modification to the existing event setting information, wherein the confidence level comprises a value indicative of a confidence that the modification to the existing event setting information is correct; and modify the existing event setting information if the confidence level associated with the modification to the existing event setting information is higher than a confidence level associated with the existing even setting information.

10. The system of claim 8, wherein the instruction comprises an application program interface (API) call.

11. The system of claim 8, wherein the program instructions, when executed by the processing system, further direct the processing system to: download the consumer application from a download portal of an application deployment system; and register the consumer application with the data sharing platform.

12. The system of claim 11, wherein to register the application with the data sharing platform, the program instructions are further configured to direct the processing system to: send a registration request to the data sharing platform, wherein the registration request includes a unique platform identifier and an application identifier, and wherein the unique platform identifier comprises a user identifier.

13. The system of claim 8, wherein the program instructions, when executed by the processing system, further direct the processing system to: receive a request to read the existing event setting information associated with the application; and responsive to receiving the request, provide the existing event setting information.

14. One or more non-transitory computer readable storage media having instructions stored thereon which, when executed by a processing system, direct the processing system to at least process a received instruction to invoke a consumer application in a runtime environment, wherein the instruction is generated by a data sharing platform based on one or more application data feeds generated by one or more producer applications registered with the data sharing platform; automatically invoke the consumer application in the runtime environment, wherein the instruction identifies the consumer application to be invoked and configuration information associated with an action to be performed by the consumer application, wherein the configuration information includes a modification to existing event setting information; and once the consumer application is invoked, direct the consumer application to perform the action.

15. The one or more computer readable storage media system of claim 14, wherein the program instructions, when executed by the processing system, further direct the processing system to: identify a confidence level associated with the modification to the existing event setting information, wherein the confidence level comprises a value indicative of a confidence that the modification to the existing event setting information is correct; and modify the existing event setting information if the confidence level associated with the modification to the existing event setting information is higher than a confidence level associated with the existing even setting information.

16. The one or more computer readable storage media system of claim 14, wherein the instruction comprises an application program interface (API) call.

17. The method of claim 1, wherein the value indicative of the confidence that the modification to the existing event setting information is correct comprises a percentage.

18. The method of claim 1, wherein the consumer application comprises a third-party application that is downloaded from a download portal of an application deployment system.

19. The method of claim 18, further comprising: prior to receiving the instruction, registering, by the application platform, the third-party application with the data sharing platform.

20. The method of claim 19, wherein registering the third-party application comprises generating and sending a registration request to the data sharing platform, wherein the registration request includes a unique platform identifier that identifies the application platform and an application identifier that identifies the third-party application.

* * * * *